(12) United States Patent
Ellis-Brown

(10) Patent No.: US 8,763,802 B2
(45) Date of Patent: Jul. 1, 2014

(54) CASES FOR PORTABLE ELECTRONIC DEVICES

(75) Inventor: James Ellis-Brown, Brighton (GB)

(73) Assignee: Heylo Ltd, Warnham (GB)

( * ) Notice: Subject to any disclaimer, the term of this patent is extended or adjusted under 35 U.S.C. 154(b) by 0 days.

(21) Appl. No.: 13/275,645

(22) Filed: Oct. 18, 2011

(65) Prior Publication Data

US 2012/0118772 A1    May 17, 2012

Related U.S. Application Data

(60) Provisional application No. 61/423,265, filed on Dec. 15, 2010.

(30) Foreign Application Priority Data

Oct. 19, 2010   (GB) .................................. 1017624.6

(51) Int. Cl.
*B65D 85/00*   (2006.01)
*G06F 1/16*    (2006.01)

(52) U.S. Cl.
CPC ...... *G06F 1/1628* (2013.01); *G06F 2200/1633* (2013.01); *G06F 1/1632* (2013.01)
USPC ...................... 206/320; 455/575.1; 455/575.8

(58) Field of Classification Search
USPC .......... 206/320; 455/550.1, 566, 575.1, 575.8
See application file for complete search history.

(56) References Cited

U.S. PATENT DOCUMENTS

| 2003/0036412 A1* | 2/2003 | Chong | .......................... 455/566 |
| 2004/0090773 A1 | 5/2004 | Bryan | |
| 2006/0181839 A1* | 8/2006 | Yamada | ........................ 361/627 |
| 2009/0124308 A1* | 5/2009 | Lee | ............................. 455/575.3 |
| 2010/0096284 A1* | 4/2010 | Bau | ................................ 206/320 |

FOREIGN PATENT DOCUMENTS

| EP | 1 742 139 A1 | 1/2007 |
| EP | 2 059 005 A2 | 5/2009 |
| WO | 2011090536 | 7/2011 |

* cited by examiner

*Primary Examiner* — Myron K Wyche
(74) *Attorney, Agent, or Firm* — Tarolli, Sundheim, Covell & Tummino LLP

(57) ABSTRACT

A case for a portable electronic device (especially for an iPhone and the like) comprises a shell 50, an electroluminescent (EL) panel 10 and associated power and control electronics housed on a printed circuit board 20. The electronics on the PCB include a connector 22 for mating with a corresponding connector on the portable electronic device so as to form an electrical connection to a power source in the portable electronic device. Another of the electrical components is There are further provided an inverter 24 and a transformer 26 to convert the low voltage DC power from the portable electronic device into approximately 180 V AC as required to power the EL panel 10. The shell 50 has a clear back 52 through which light produced by the EL panel 10 shines. Interchangeable graphics panels 100 can be slid into a pocket disposed between the EL panel 10 and the back 52 of the shell so as to customise the visual appearance of the case and hence the portable electronic device inside.

17 Claims, 5 Drawing Sheets

CASES FOR PORTABLE ELECTRONIC DEVICES

FIELD OF THE INVENTION

The invention relates to cases for portable electronic devices, and in particular to cases that are able both to perform a protective function and to enable the visual appearance of the case (and therefore the portable electronic device) to be changed with ease.

BACKGROUND TO THE INVENTION

Protective cases for portable electronic devices are well known and have become almost ubiquitous in the market for certain mobile telephones, such as the iPhone™.

It is also known to provide exchangeable outer panels to adapt the external appearance of portable electronic devices, such as laptops, netbooks, MP3 players and mobile phones.

The concepts of a protective case and exchangeable graphics have been combined in, for example, the "Marware CustomShell for iPhone 4", which is an iPhone™ 4 case that has a clear window on its back within which to receive interchangeable cards to make the case customisable.

Electroluminescent (EL) paper is a phosphorescent paper that glows or lights up when an AC current is passed through it from an electrical source. EL paper is coated in a phosphorescent-rich material over an electrically conductive surface or layer which is then vacuum sealed and wired up to receive power supply of approximately 180 V AC. This allows the current to flow evenly over the surface, illuminating all of the paper, including the edges, consistently. EL paper is encapsulated in a clear, thin plastic sealed cover to form a panel that is protected from atmospheric moisture and which helps to sustain the life of the EL paper. EL paper has a typical bulb life of about 2000 lit hours.

It is known to use EL panels in portable electronic devices. For example, there is a mobile phone made my Motorola called the Z3 which uses the same illuminated technology behind its touch pad keyboard.

EL panels have also been used in advertising; especially in window displays, bus stop ad-shells, window stickers and on t-shirts. The EL paper is expensive to use on large formats and generally is only created as flagship or one-off ad.

It is an objective of the present invention to provide a case having a striking illuminated visual appearance that can readily be altered. It would be preferable, but not essential, for the case additionally to perform a protective function.

It is another objective of the present invention to allow the user to customise their portable electronic device and use the illuminated case as a fashion accessory.

The illuminated case could also be used as a safety feature or beacon to illuminate, attract attention or be used as a warning device, including Morse code. It could be furthermore be used as an advertisement accessory.

SUMMARY OF THE INVENTION

According to a first aspect of the invention, there is provided a case for a portable electronic device, the case comprising:
  a shell defining an interior volume dimensioned so as to snugly accommodate a particular portable electronic device, wherein at least a portion of the shell is translucent or transparent;
  an electroluminescent panel, visible through said translucent or transparent portion of the shell; and
  a connector, electrically connected to the electroluminescent (EL) panel and positioned so as to inter-engage with a mating connector on the portable electronic device when inserted into the interior volume so as to form an electrical connection between a power source in the portable electronic device and the EL panel.

Such a case enables an illuminated display to be provided for aesthetic and/or functional benefit and to meet the objectives set out above.

The case typically further comprises an inverter electrically connected between the connector and the EL panel to convert a DC output from the power source of the portable electronic device into an AC input to drive the EL panel. The majority of portable electronic devices have a power source that supplies DC power. Since EL panels require an AC input to function, where there is no AC output from the portable electronic device an inverter is necessary.

The case typically further comprises a transformer electrically connected between the connector and the EL panel, the transformer configured to supply an approximate 180 V AC to the EL panel. In a typical portable electronic device having a power output connector, the output voltage is in the region of 3-5 V. Since EL panels require a voltage in the region of 180 V AC to function, where the voltage supplied from the portable electronic device is much lower a transformer is necessary to up the voltage. This also ensures a safe operating current of some 60 mA or 0.30 Watt.

Preferably, the connector and, if present, the inverter and the transformer are housed on a printed circuit board (PCB). This enables a compact and robust arrangement of the electrical components forming the electrical circuit between the connector of the portable electronic device and the EL display. Preferably, the PCB is rigidly mounted in the shell such that the connector protrudes into the interior volume for inter-engagement with the mating connector on the portable electronic device. By such an arrangement, connection between the connector on the PCB and the mating connector on the portable electronic device is made automatically on inserting the portable electronic device into the interior volume of the case.

Portable electronic devices often include a display. In order for such a display to be visible, and, where the display is interactive, for a user to be able to interact with the display, the shell includes a window through which the display on the portable electronic device is visible when received in the interior volume.

In a particularly preferred embodiment, the case further comprises a pocket interposed between the EL panel and the transparent or translucent portion of the shell for receiving a transparent graphic. With a transparent graphic inserted into the pocket, light emitted by the EL panel will pass through transparent portions of the graphic, be blocked by opaque portions, and be colour-filtered by coloured portions, thus providing striking visual graphics. Preferably, the pocket includes a slot at one end through which transparent graphics can be slid, so as to enable their interchange. In this way, a user can readily change the visual appearance of their portable electronic device by simply exchanging one transparent graphic for another. In order to facilitate such exchange of graphics, The pocket preferably includes a recess adjacent the slot, thus making the sliding of transparent graphics into and out of the pocket easier for a user.

Typically, at least the translucent or transparent portion of the shell is formed of non-reflective, clear polycarbonate. This material is tough and strong, to enable the case to perform a protective duty, yet also has minimal influence on the transmittal of light therethrough, ensuring a crisp and clear illuminated display. Whereas the entire shell could be formed from such polycarbonate, it might be beneficial for the sides of the shell to be formed of rubber, bonded to the polycarbonate portion, because rubber sides would be better able to absorb impacts and protect the portable electronic device within, yet would not be suited to transmittal of light.

The case might typically be adapted to receive a particular mobile telephone, such as an iPhone™.

In one embodiment, a number of EL panels are provided, each independently addressable by control circuitry for selective illumination. Such an arrangement would enable individual panels to be switched on and off in sequence, thus enabling animated displays.

According to a second aspect of the invention, there is provided a case for a portable electronic device, the case comprising:
a shell defining an interior volume dimensioned so as to snugly accommodate a particular portable electronic device, wherein at least a portion of the shell is translucent or transparent;
a light source, mounted to the shell and visible through said translucent or transparent portion of the shell; and
means, mounted to the shell, for supplying electrical power to the light source.

The electrical power supply means may comprise a connector, electrically connected to the light source and positioned so as to inter-engage with a mating connector on the portable electronic device when inserted into the interior volume so as to form an electrical connection between a power source in the portable electronic device and the light source. Alternatively, the electrical power supply means may comprise a battery mounted to the shell.

The light source typically comprises an electroluminescent (EL) light source, such as an EL panel or EL wire. However, it is anticipated that the light source might instead be, for example, an array of LEDs.

BRIEF DESCRIPTION OF THE DRAWINGS

The invention will be described, by way of example, with reference to the accompanying drawings, in which.

DETAILED DESCRIPTION

In the following description, reference will be made to an inventive case adapted to receive a mobile telephone, particularly the Apple™ iPhone™ 4, but it will be appreciated that the invention is equally applicable to other brands of mobile phone as well as other portable electronic devices, such as the Apple™ iPod™, Apple™ iPad™, other tablet devices, laptops, netbooks, palmtops, PDAs, MP3 players, etc.

Figure 1:
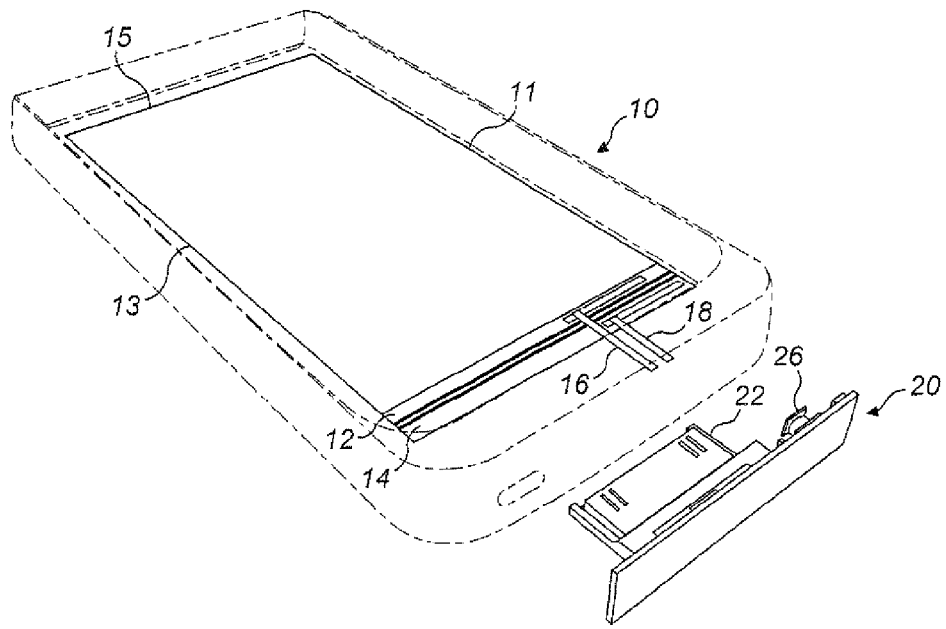
FIG. 1 is an illustrative perspective view of an electroluminescent (EL) panel and associated electronic components on a printed circuit board (PCB)

An electroluminescent (EL) panel 10 as used in the present invention is illustrated schematically in FIG. 1. The EL panel is of typical construction, comprising a EL paper layer covered by a phosphorescent-rich material and superposed on an electrically conductive layer, all encapsulated in clear plastic. At a bottom edge of the EL paper, inside the clear plastic encapsulation are two strips 12, 14 of thin metal running horizontally across the bottom edge of the paper that act as positive and negative connections to form an electrical circuit on the EL paper. Leading off from each of these is a respective connective flat wire 16, 18 for connecting the EL panel 10 to a power source.

Figure 2:
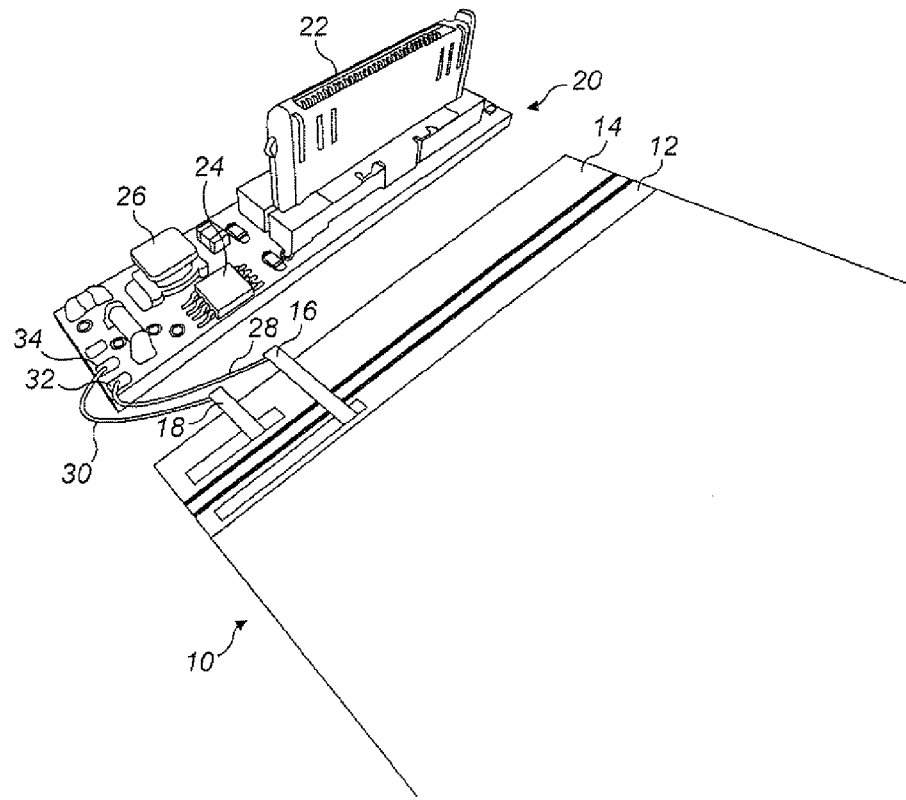
FIG. 2 is a schematic view of the EL panel and PCB electrically connected by leads.

As best seen in FIG. 2, electrical components for forming an electrical circuit to supply and control power to the EL panel 10 are housed on a printed circuit board (PCB) 20. The electrical components include a connector 22, an inverter 24 and a transformer 26. The EL panel 10 is electrically connected to the PCB by means of leads 28, 30 connecting the respective flat wires 16 and 18 to associated contacts 32, 34 on the PCB. The PCB is about 1.5 mm thick.

Whereas the PCB 20 in FIG. 2 is shown tilted with respect to the associated EL panel 10 to illustrate the location of the various electrical components on the PCB, it is shown in the correct orientation with respect to the associated EL panel 10 in FIG. 1. In particular, the connector 22 is aligned in a plane that is parallel to the plane of the EL panel 10.

The connector 22 is a 30 pin male connector which mates with a corresponding 30 pin female connector (not shown) of the iPhone (not shown).

The inverter 24 is a silicon Integrated Circuit (IC) DC to AC inverter which converts the power from the iPhone battery, which supplies output power via the mating connector in the range of 3-5 V DC.

The inverter 24 is only switched on using the switched 3-5 V DC output when the iPhone is not in standby mode, thereby saving battery life and minimising the additional current drain on the battery.

The transformer 26 is a mini transformer that drives the 3-5 V voltage up to 180 V AC. The transformer is needed because the EL paper requires a high voltage to run and with an electrical current flow of 60 mA or 0.30 Watt.

All the electrical components needed to run the EL panel 10 are on the PCB 20 and nowhere else (with the exception of the components within the iPhone or other portable electronic device to which the PCB 20 is connected in use).

A shell 50 comprises a back 52, two long sides 54*a*, 54*b*, a top end 56 and a bottom end 58, which together define an interior volume within which to receive the iPhone™. The back 52, or at least a portion thereof, is flat and formed of a non-reflective, clear polycarbonate material. The sides 54*a,b*, and ends 56, 58 are formed of rubber, which may be opaque, but which add no significant bulking along the outside edges or rim of the iPhone. The clear polycarbonate back 52 and solid opaque rubber sides 54*a,b* and ends 56, 58 are bonded together as one smooth piece. The shell 50 is thus made as a unitary piece and does not have interlocking parts as some cases do. This will preserve the feel of the iPhone within. The rubber sides 54*a,b* act as grip as well as protecting the iPhone's sides and notably also protect the iPhone's signal strength from short circuiting and interference which Apple's 'Bumper' also provides.

The top 56 of the shell 50 is made of a rubber band 56 in the same material as the rubber protective sides 54a,b and this rubber band 56 allows the phone to side in and the top of the case to still have a protective cover/edge. In particular, a lip 57 over the outside top end 56 and side edges 54a,b of the shell defines a window on a front side that provides unhindered access to the iPhone's display, to enable a user to both see and interact with the display. The flexibility and resilience of the top rubber end 56 enables that end to be stretched and/or deflected to enable the portable electronic device to be inserted into the shell 50.

There is a hole 60 through the back 52 of the shell for the camera lens and flash of the iPhone™ so they are not covered and can still operate while the case is attached.

The control at the top of the iPhone™ is accessed with a raised rubber pressure button 61 integrated into the same material so that the control location and pressability is not lost. There is also be a hole 62 for the headphone jack.

The PCB 20, including the connector 22 and wiring 28, 30 to the EL panel 10, is housed in the base of the shell 50 which extends approximately 10 mm beyond the bottom of an iPhone adjacent the bottom end 58. The base of the shell 50 has a small rounded rectangular hole 63 at the bottom for the iPhone's microphone and an identical hole 64 at the back 52 of the shell, on the other side, for the iPhone's speaker. There is no hole for access to the iPhone™ connector as the iPhone's connector will be mated with the connector 22 of the case.

Figure 10:
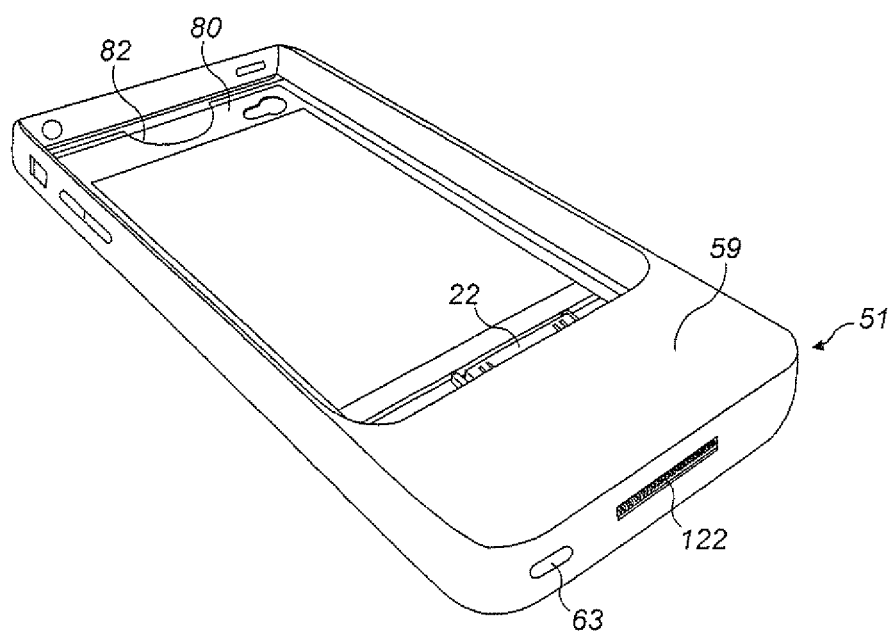
FIG. 10 corresponds to FIG. 4, but shows another alternative embodiment of the case, having a piggy-back connector.

As shown in FIG. 10 however, an alternative embodiment is envisaged in which there is a 30 pin 'piggy back' connector 122 into the case, so that it would be possible to charge the iPhone while it was still received within the case.

The other iPhone™ buttons or controls are accessible still with the case covering the iPhone. The rubber rim has built-in internal raised rubber pressure buttons 61, 65 (which might alternatively be formed as apertures) to work the controls from the outside of the case. The mute switch will be accessible through a hole 66 in the top side of the rim.

The case, which comprises the shell 50, the EL panel 10 and the associated electronics, housed on the PCB 20 is very light weight, including its electronics.

The iPhone slides into the case in a straight downward direction guided by the front lip 57 and sides 54a,b of the shell 50, the top end 56 having been deflected/stretched out of the way. This is important so that the iPhone™ docks with the case's connector 22 in a straight line, both when inserting and removing the iPhone™. This prevents bending the case connector 22 while connected to the iPhone™. The iPhone™ is gripped securely and snugly by the sides 54a,b and ends 56, 58 of the shell 50.

Of course, where the shell 50 is adapted to receive a different portable electronic device, the size and shape of the shell and the number, form and location of the cut-outs and buttons will be different and adapted to that particular device.

The EL panel 10 is fixed into the shell 50 along its two long edges 11, 13 and at the bottom near the electronics of the PCB 20. Only these three outside edges are secured, such as by gluing or welding to the inside back 52 of the shell 50. The top edge 15 and illuminated front of the EL panel 10 is not stuck down to the shell 50. A pocket is thus created between the inside back 52 of the shell 50 and the EL panel 10 so that a transparent graphic 100 can be inserted and remain secured in front of the illuminated side of the EL panel 10, between the panel and the shell 50. This will allow the illuminated side of the EL panel 10 to shine through the graphic 100 and the clear back portion 52 of the shell 50.

Inside the case, in front of the EL panel 10 there is a protective clear plastic cover 80 which helps protect the EL panel 10 from the wear and tear of inserting and extracting the iPhone™ from the case. This clear cover 80 has a semi-circle thumb-sized recess 82 at the top to allow the interchangeable graphic panel 100 to be removed easily.

The transfers 100, which are the interchangeable graphic panels on the reverse slide of the shell 50, enable customization of the case. The transfer print process, which is called Lambder, is a unique process where the graphics 102 are printed at a high resolution onto a clear plastic called a Duratran, Fujitran or a Duraflex amongst other vinyl. The contrast of the print is very high, which essentially allows for a solid black and/or a completely clear white (amongst all other colours) to be printed on the one sheet 100.

The interchangeable graphics 100 slide into the pocket in the case in between the transparent, flat polycarbonate back 52 of the shell 50 and the EL panel 10. There is a slot at the top end of the pocket which helps to guide the graphic panel 100 in place. The graphic panel 100 is simply removed with the help of the recess 82 in the protective layer 80.

Figure 3:
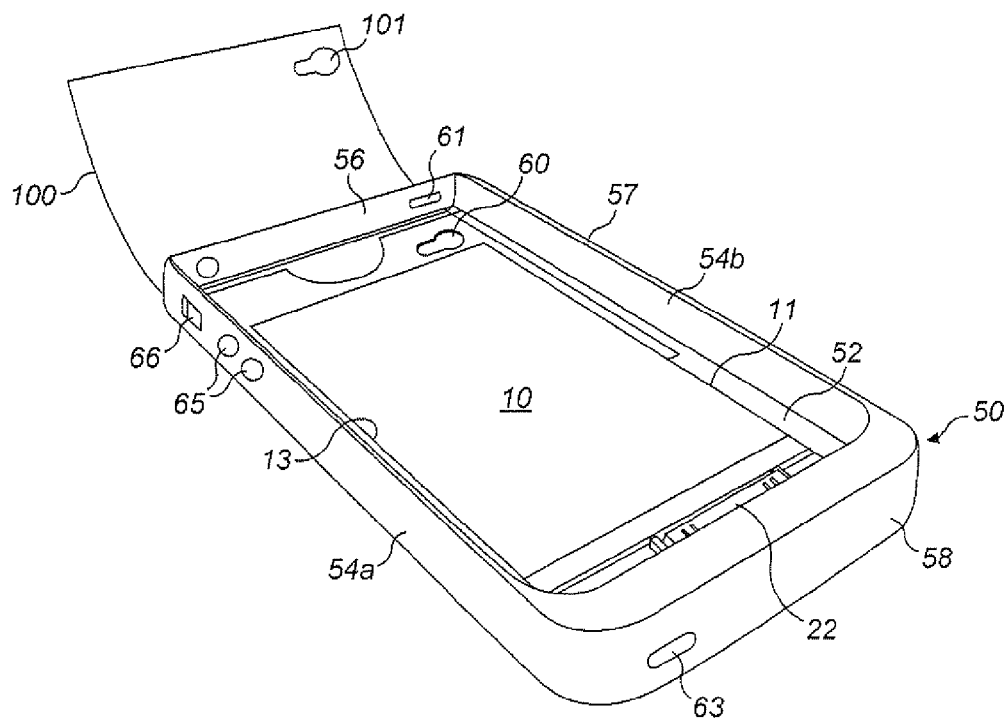
FIG. 3 is a top perspective view of a case according to the invention, showing an interchangeable transparent graphic being slid into position.
Figure 4:
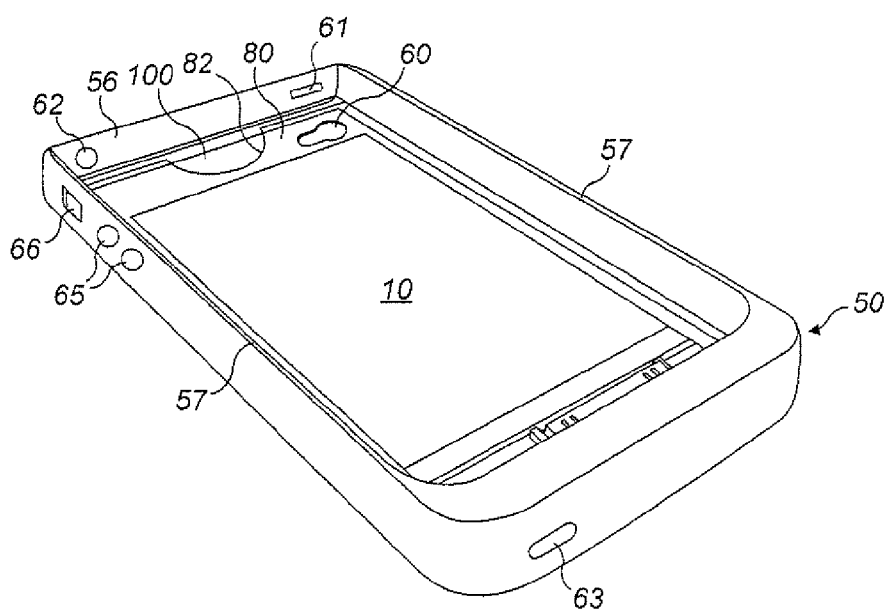
FIG. 4 corresponds to FIG. 3, but shows the transparent graphic fully located in position.
Figure 5:
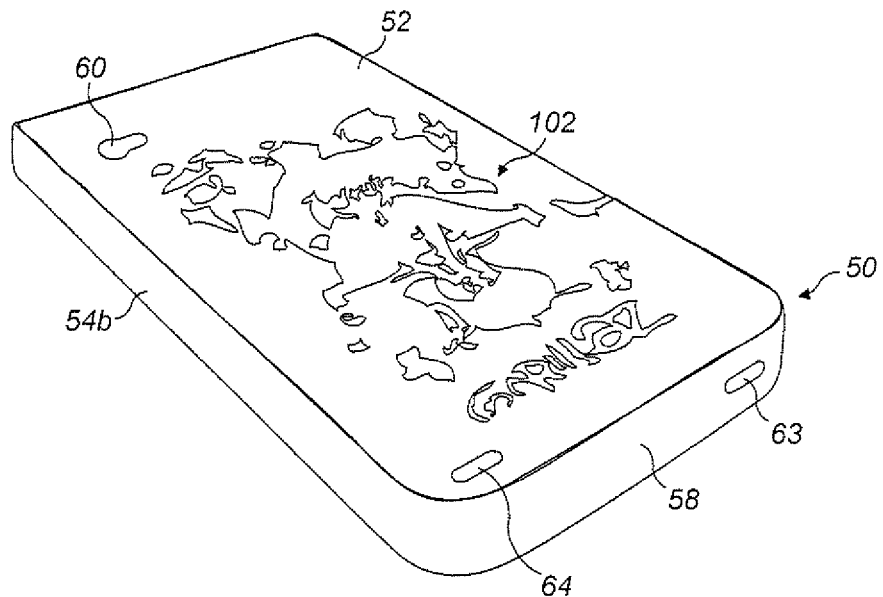
FIG. 5 is bottom perspective view corresponding to FIG. 4, showing exemplary graphics.
Figure 6:
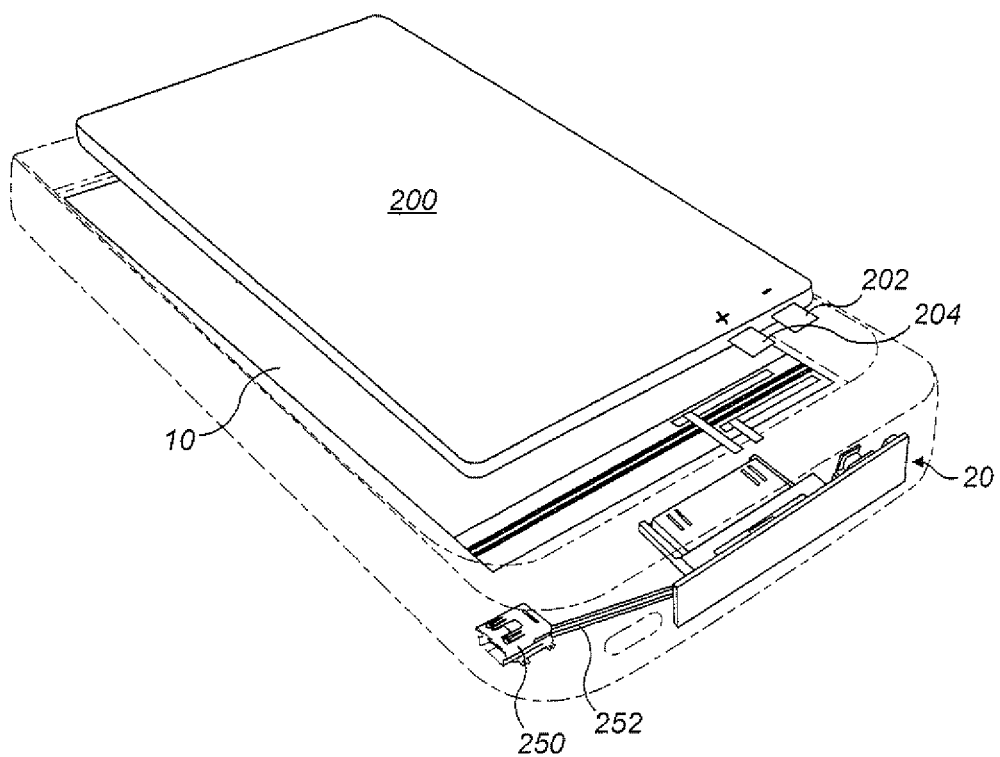
FIG. 6 corresponds to FIG. 1, but shows an alternative embodiment having a battery and a charging point.
Figure 7:
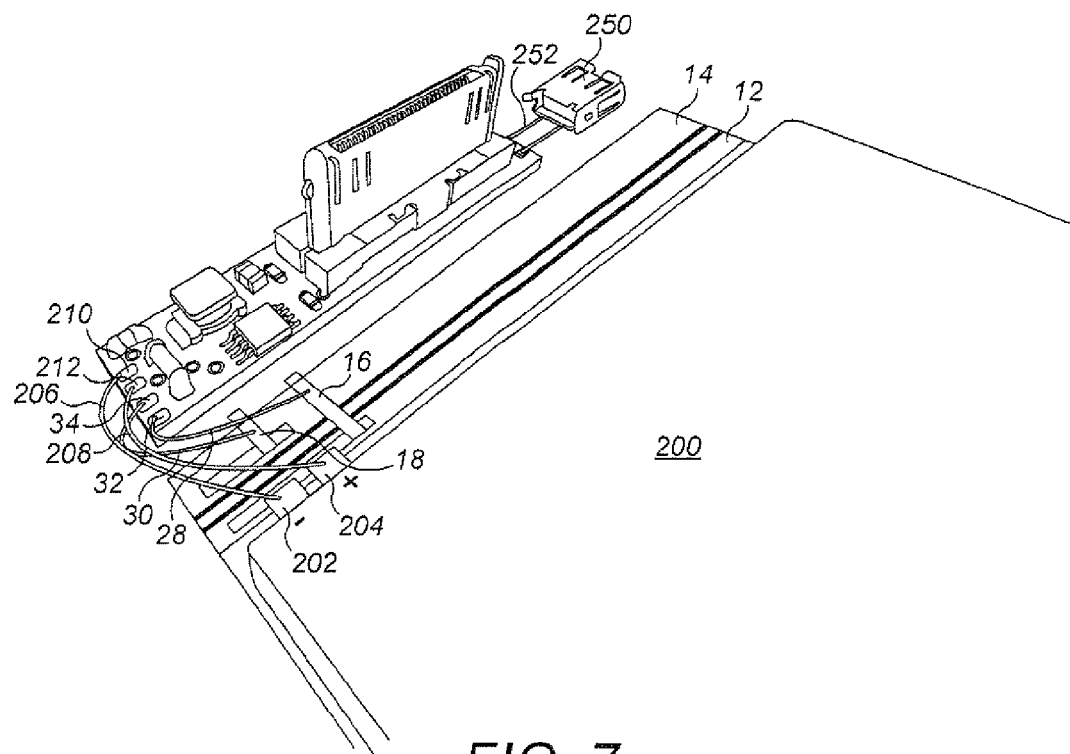
FIG. 7 corresponds to FIG. 2, but showing the embodiment of FIG. 6.
Figure 8:
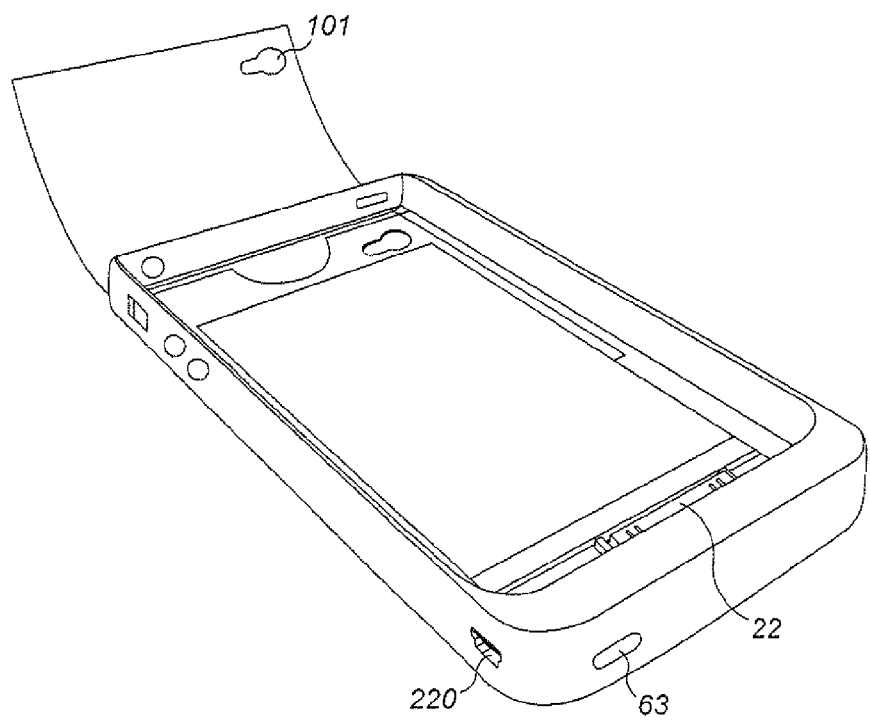
FIG. 8 corresponds to FIG. 3, but showing the embodiment of FIG. 6.
Figure 9:
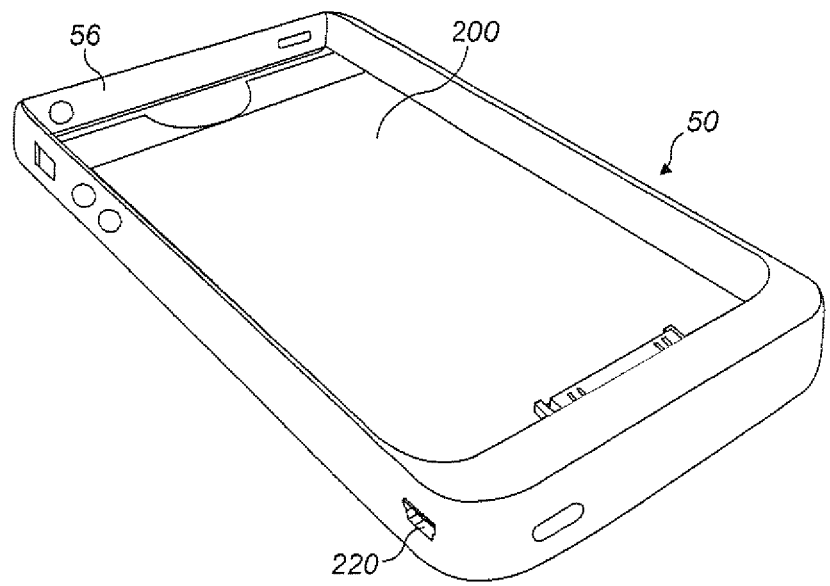
FIG. 9 corresponds to FIG. 4, but showing the embodiment of FIG. 6.

The graphic panel 100 may include a die-cut camera lens/flash hole 101 (see FIG. 3) which, when the graphic panel 100 is fully inserted, is in registration with the camera lens/flash as well as the corresponding hole 60 in the back 52 of the shell.

The case has to be detached from the iPhone™ to change the graphic panel 100.

Instead of power being supplied to the EL panel 10 by means of mating connectors on the case and the portable electronic device respectively, the power source could be integrated into the case. For example, the power source might comprise a battery mounted to the shell 50 of the case. Such an arrangement would have the advantage of dispensing with the mating connector from the case, which would in turn free the corresponding connector of the portable electronic device for alternative use (e.g. recharging the portable electronic device).

Such an alternative embodiment of the case is illustrated in FIGS. 6-9. In this alternative embodiment, a thin, planar battery 200 is received within the case, behind the EL panel 10 and the graphic panel insert 100. The purpose of the battery 200 is to provide power for the EL panel 10 only; it is not intended as a supplementary source of power for the encased device. Accordingly, the battery can be smaller and lighter than in applications where a battery within a case is used as an additional power supply for the device (such as the 'Mophie'™ juice pack for the iPhone™. One suitable battery 200 would be a lithium ion battery, which may up to approximately 3 mm deep and have approximately the same plan dimensions as the EL panel 10.

The battery 200 is connected to the PCB 20 by wires 206, 208 between negative and positive terminals 202, 204 on the battery and associated terminal contacts 210, 212 on the PCB.

This alternative embodiment results in a stand-alone case; there is no need for the connector 22 on the PCB 20. Instead, the PCB (and the portion of the shell 50 in registration therewith) may have an aperture (not shown) for access to the device's connector through the bottom end 58 of the shell. In order to trigger the EL panel 10, the shell 50 may house an electromagnetic frequency (EMF) sensor (not shown), for example on the PCB 20. The EMF sensor would detect the transmissions between the phone and the network and trigger the EL panel 10 to light up when a call, text, MMS, email or any transmission that uses the network is made.

Nevertheless, the connector 22 may still be provided in conjunction with the battery 200, for example to retain a hard-wired connection to the device.

The battery 200 is preferably rechargeable, and may be recharged via a charging port 250, such as a female micro-USB port, that is electrically connected to the battery terminals 202, 204 via the PCB 20 and leads 252.

In another alternative embodiment (not shown), it is envisaged to provide more than one (smaller) EL panel 10 and to have each independently addressable by control circuitry for selective illumination. Such an arrangement would enable individual panels 10 to be switched on and off in sequence, thus enabling animated displays.

For example, if a step-by-step animation was designed, each EL paper panel 10 would turn on and off in sequence. This would work for either a graphic equalizer animation where the lights would jump up and down or a ring of concentric circles or rectangles moving in and out. An animation is a good way of also drawing attention to the phone if the user is in a noisy environment like a pub or nightclub and can see their phone case pulsing or animating telling them there is a call or message.

The concepts set out above in the context of a case for an iPhone™ would also work identically for the and Apple iPad™, but the EL panel 10 would need to be larger and would require a little more power so making the electronics slightly different to cope with the extra voltage. The case would of course be larger. Likewise, the concept would also work when applied, with suitable amendments, to the Apple iPod™.

In other phone models, the underlying concepts and technology would be the same again, but where there is no 30 pin connector a phone's mini USB could instead provide power for the same purpose. The case would have a different design.

If the invention were to be adapted to work for a laptop cover, the power source would come from a USB port and the same electronics and EL paper would be used, but the shape of the cover or case and the integral EL panel and the associated graphics would of course be bigger.

Rather than using an EL panel, illumination might instead be supplied by the use of EL wire (such as described at http://www.glow.co.uk/el-wire-glow-wire-products.html), which might be arranged behind a transparent protective outer panel.

Rather than through electroluminescence, illumination might instead be provided by any suitable light source. In particular, it is envisaged that the light source could be LEDs, for example arranged as an array.

The invention claimed is:

1. A case for a portable electronic device, the case comprising:
    a shell defining an interior volume dimensioned so as to snugly accommodate and enclose a particular complete portable electronic device, the shell being interposed between at least a portion of each surface of the electronic device and an ambient space, wherein at least a portion of the shell is translucent or transparent;
    an electroluminescent panel, visible through said translucent or transparent portion of the shell;
    a connector, electrically connected to the electroluminescent (EL) panel and positioned so as to inter-engage with a mating connector on the portable electronic device when inserted into the interior volume so as to form an electrical connection between a power source in the portable electronic device and the EL panel; and
    a pocket interposed between the EL panel and the transparent or translucent portion of the shell for receiving a transparent graphic.

2. The case of claim 1, further comprising an inverter electrically connected between the connector and the EL panel to convert a DC output from the power source of the portable electronic device into an AC input to drive the EL panel.

3. The case of claim 1, further comprising a transformer electrically connected between the connector and the EL panel, the transformer configured to supply an approximate 180 V AC to the EL panel.

4. The case of claim 1, in which the connector and, if present, the inverter and the transformer are housed on a printed circuit board (PCB).

5. The case of claim 4, wherein the PCB is rigidly mounted in the shell such that the connector protrudes into the interior volume for inter-engagement with the mating connector on the portable electronic device.

6. The case of claim 1, wherein the shell includes a window through which a display on the portable electronic device is visible when received in the interior volume.

7. The case of claim 1, wherein the pocket includes a slot at one end through which transparent graphics can be slid, so as to enable their interchange.

8. The case of claim 7, wherein the pocket includes a recess adjacent the slot to facilitate the sliding of transparent graphics into and out of the pocket.

9. The case of claim 1, wherein at least the translucent or transparent portion of the shell is formed of non-reflective, clear polycarbonate.

10. The case of claim 9, wherein the sides of the shell are formed of rubber, bonded to the polycarbonate portion.

11. The case of claim 1, wherein the portable electronic device is a mobile telephone.

12. The case of claim 11, wherein the mobile telephone is an iPhone™.

13. The case of claim 1, further comprising additional EL panels, each independently addressable by control circuitry for selective illumination.

14. A case for a portable electronic device, the case comprising:
    a shell defining an interior volume dimensioned so as to snugly accommodate and enclose a particular complete portable electronic device, the shell being interposed between at least a portion of each surface of the electronic device and an ambient space, wherein at least a portion of the shell is translucent or transparent;
    a light source, mounted to the shell and visible through said translucent or transparent portion of the shell;
    means, mounted to the shell, for supplying electrical power to the light source; and
    a pocket interposed between the light source and the transparent or translucent portion of the shell for receiving a transparent graphic.

15. The case of claim 14, wherein the electrical power supply means comprises a connector, electrically connected to the light source and positioned so as to inter-engage with a mating connector on the portable electronic device when inserted into the interior volume so as to form an electrical connection between a power source in the portable electronic device and the EL panel.

16. The case of claim 14, wherein the electrical power supply means comprises a battery mounted to the shell.

17. The case of claim 14, wherein the light source comprises an electroluminescent (EL) light source.

* * * * *